Aug. 13, 1940.  E. K. BENEDEK  2,211,402

FLUID PRESSURE TRANSMISSION

Filed May 2, 1936  7 Sheets-Sheet 1

INVENTOR.

ELEK K BENEDEK

ATTORNEY.

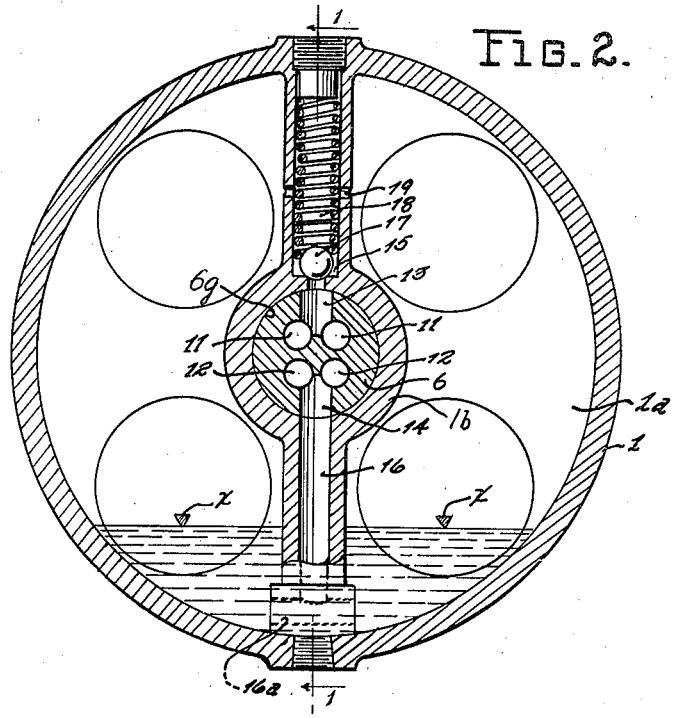

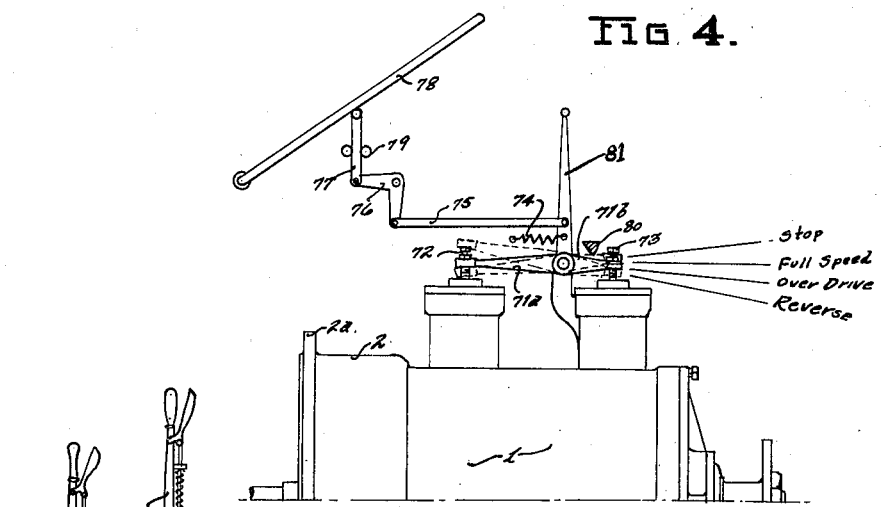
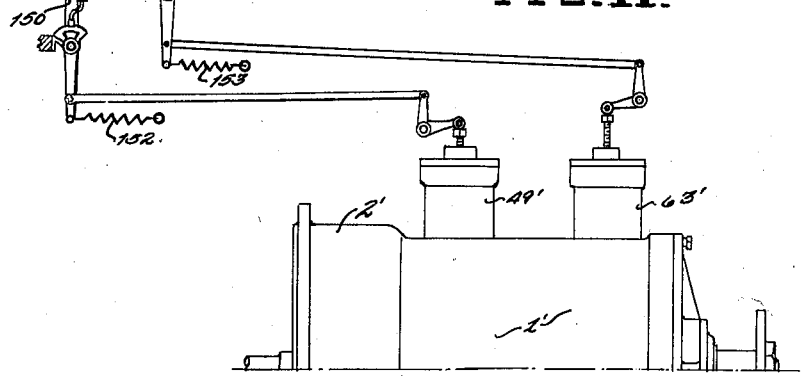
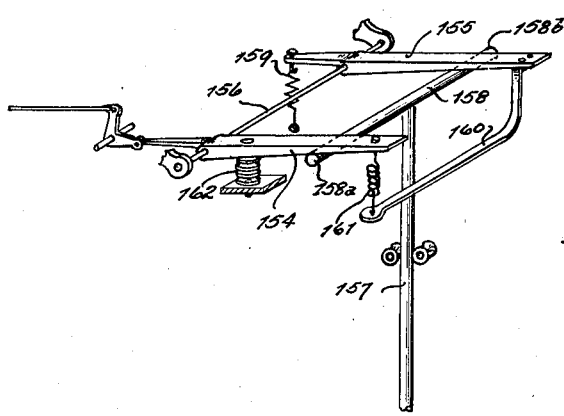

Aug. 13, 1940.  E. K. BENEDEK  2,211,402

FLUID PRESSURE TRANSMISSION

Filed May 2, 1936  7 Sheets-Sheet 4

INVENTOR.
ELEK K BENEDEK.
BY
ATTORNEY.

INVENTOR.
ELEK K BENEDEK.
ATTORNEY.

Patented Aug. 13, 1940

2,211,402

UNITED STATES PATENT OFFICE 2,211,402

FLUID PRESSURE TRANSMISSION

Elek K. Benedek, Bucyrus, Ohio

Application May 2, 1936, Serial No. 77,567

3 Claims. (Cl. 60—53)

This invention relates to hydraulic transmissions and particularly to a new and improved hydraulic transmission for use in connection with motor vehicles employing internal combustion engines.

The principal objects of the present invention are to provide a transmission wherein the price, size, and weight per unit per horsepower output, in the order given, compare favorably with the corresponding characteristics and relations of mechanical gear transmissions; to provide a transmission which will operate at a high degree of efficiency throughout a wide normal range of speeds, torques and load conditions and also at a comparatively wide range of overspeeds and overload conditions; to provide a transmission by which the speed of the prime mover or engine can be controlled independently of the torque to be transmitted, as a result of which the engine may be maintained at proper speed for delivering its maximum horsepower and the delivered horsepower transformed efficiency into the required torque under widely fluctuating load and operating conditions, and to provide for maximum torque transmission throughout the entire range of horsepower output of the engine; to provide in combination with a variable speed engine or prime mover, a variable delivery pump, and a variable speed reversible motor, as a result of which the maximum power delivered by the engine at any given engine speed may be converted into an infinite number of combinations of speed and torque efficiently.

Correlative objects are to provide a transmission of such operating characteristics that the vehicle can be driven at high speed with a comparatively low engine speed under favorable road conditions with the result that, though the engine may not be operating at maximum efficiency, the loss in efficiency is more than offset by the smaller amount of fuel consumed; and to provide for automatic acceleration of the driven vehicle or mechanism at twice the rapidity that it is now obtainable and in a manner which automatically conditions the vehicle acceleration to the operation of the engine so that more efficient coordination during acceleration is obtained; to control automatically, simultaneously, the acceleration of the engine and the change of stroke relation of the transmission so that both changes work in conjunction with each other to provide the maximum acceleration; to adjust the speed ratio and the accelerating characteristics of the transmission for rendering the transmission effective for use with various engines without change in the transmission structure.

Other objects are to eliminate the usual clutch, mechanical transmission and gear shift mechanisms; and to provide a readily reversible pressure fluid circuit which is entirely contained within the transmission mechanism casing itself and which may be reversed without reversing the pump of the transmission.

More specific objects are to provide simple and efficient pump and motor structures wherein precision and accuracy of the parts may be obtained readily by the conventional industrial practices, wherein a simplified barrel and pintle mounting, lending itself to ease and accuracy in pintle and barrel adjustment, is employed, and wherein the use of standard bearings, readily obtainable on the market, may be utilized.

Other objects and advantages will become apparent from the following specification, wherein reference is made to the drawings, in which:

Fig. 1 is a horizontal axial sectional view of a transmission embodying the principles of the present invention, and is taken on a plane indicated by the line 1—1 in Figs. 2 and 3;

Figs. 2 and 3 are vertical cross sectional views taken on planes indicated by the lines 2—2, and 3—3, respectively, of Fig. 1, the partition wall being shown in elevation for clearness in illustration;

Fig. 4 is a diagrammatic illustration of a control for the transmission illustrated in Figs. 1 to 3;

Figure 1:
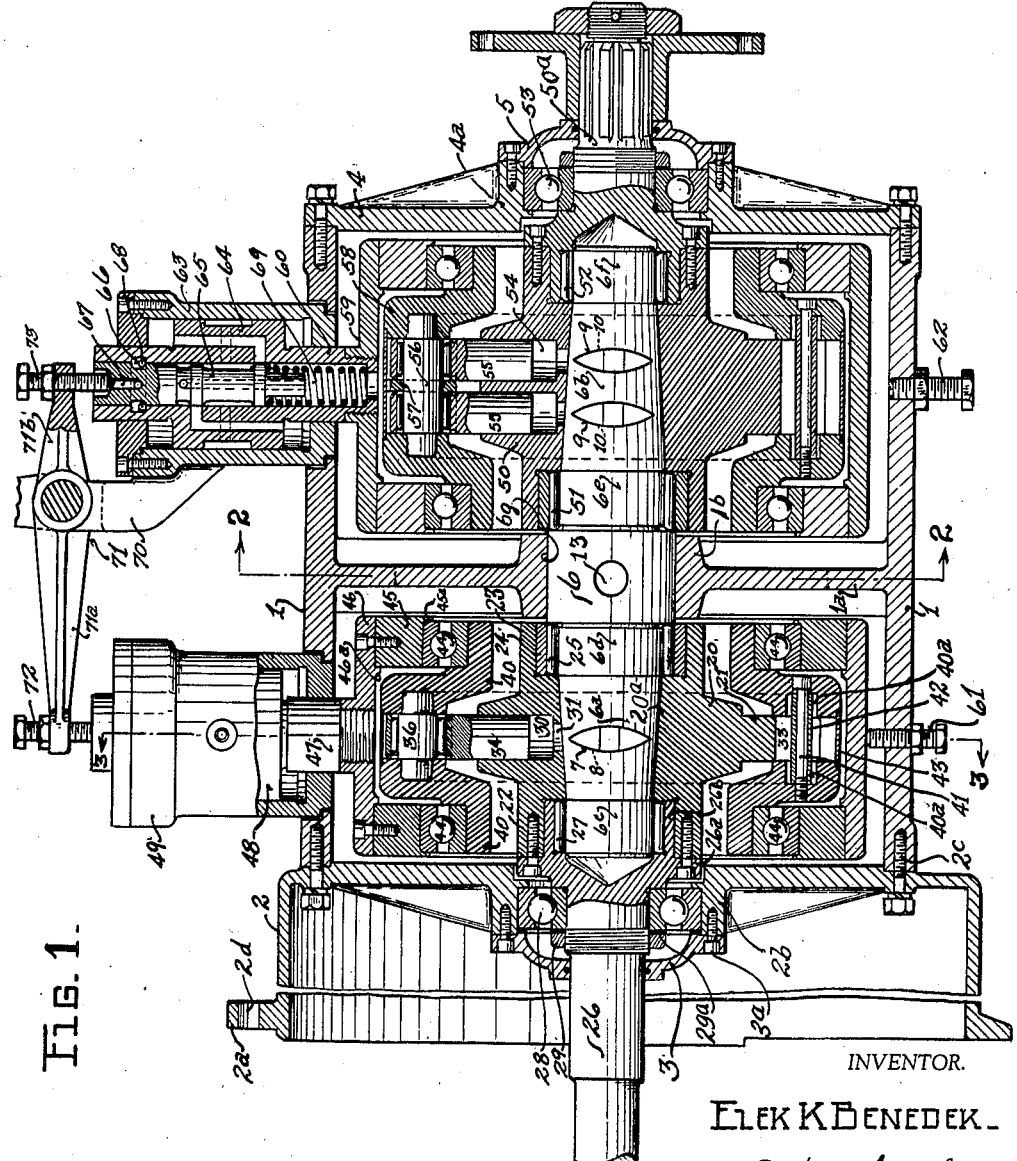
Figure 5:
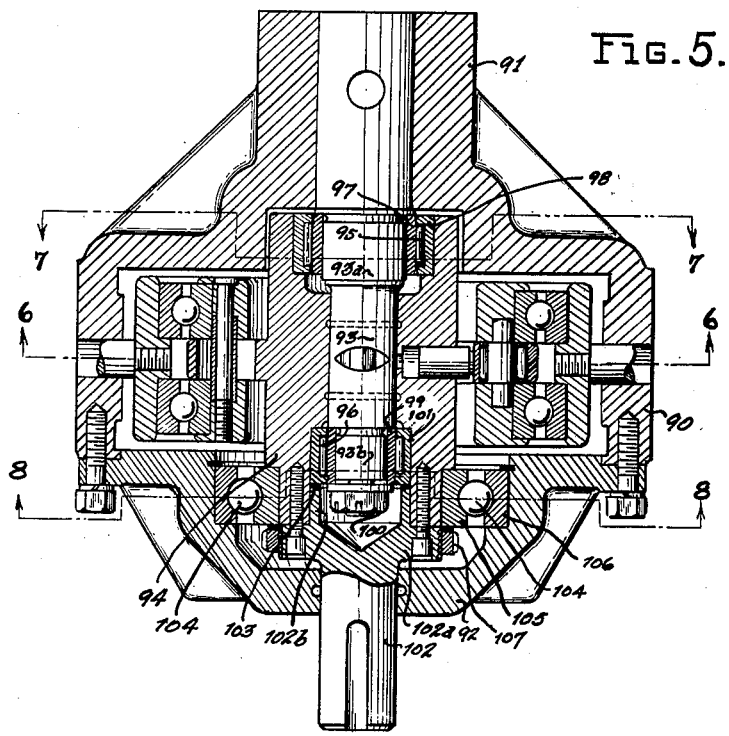
Fig. 5 is a sectional view of a pump or motor, taken on a plane through its axis of rotation, which is especially adapted for use in connection with the transmission illustrated in Fig. 1 or in connection with a transmission in which the pump and motor are placed at locations remote from each other.
Figure 6:
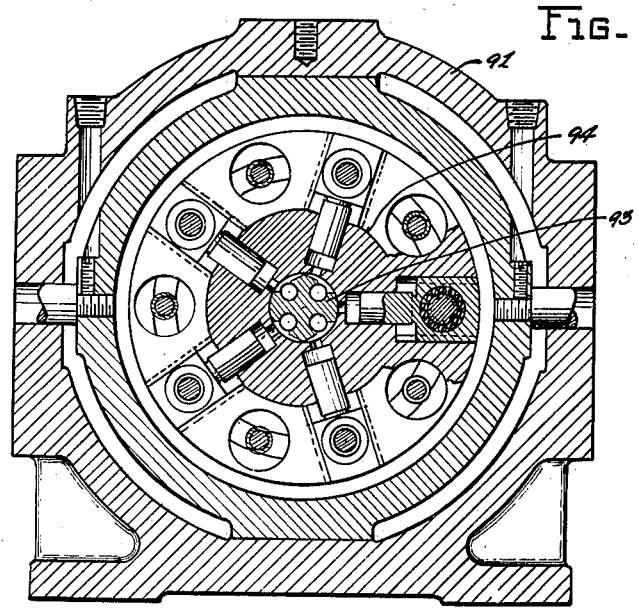
Figure 7:
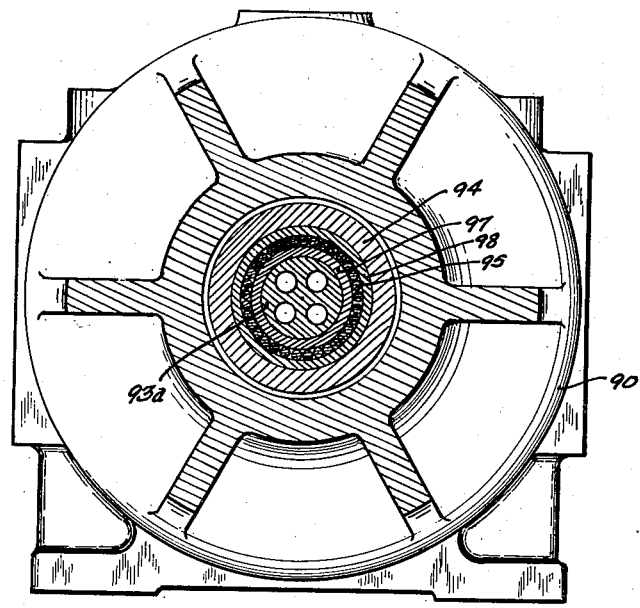
Figure 8:
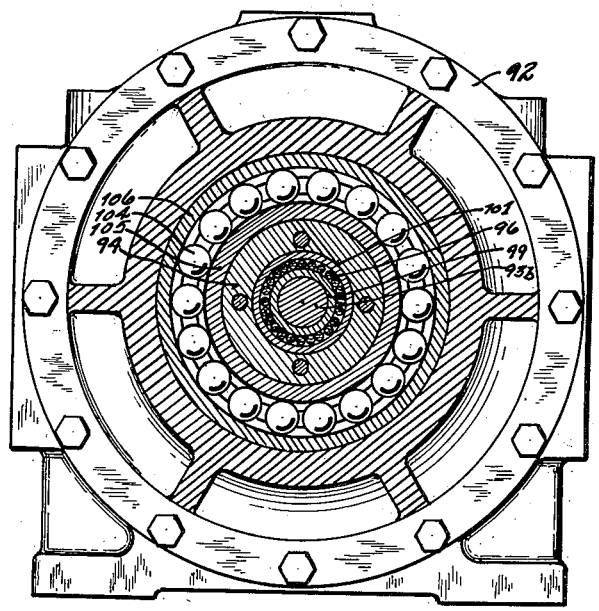
Figure 9:
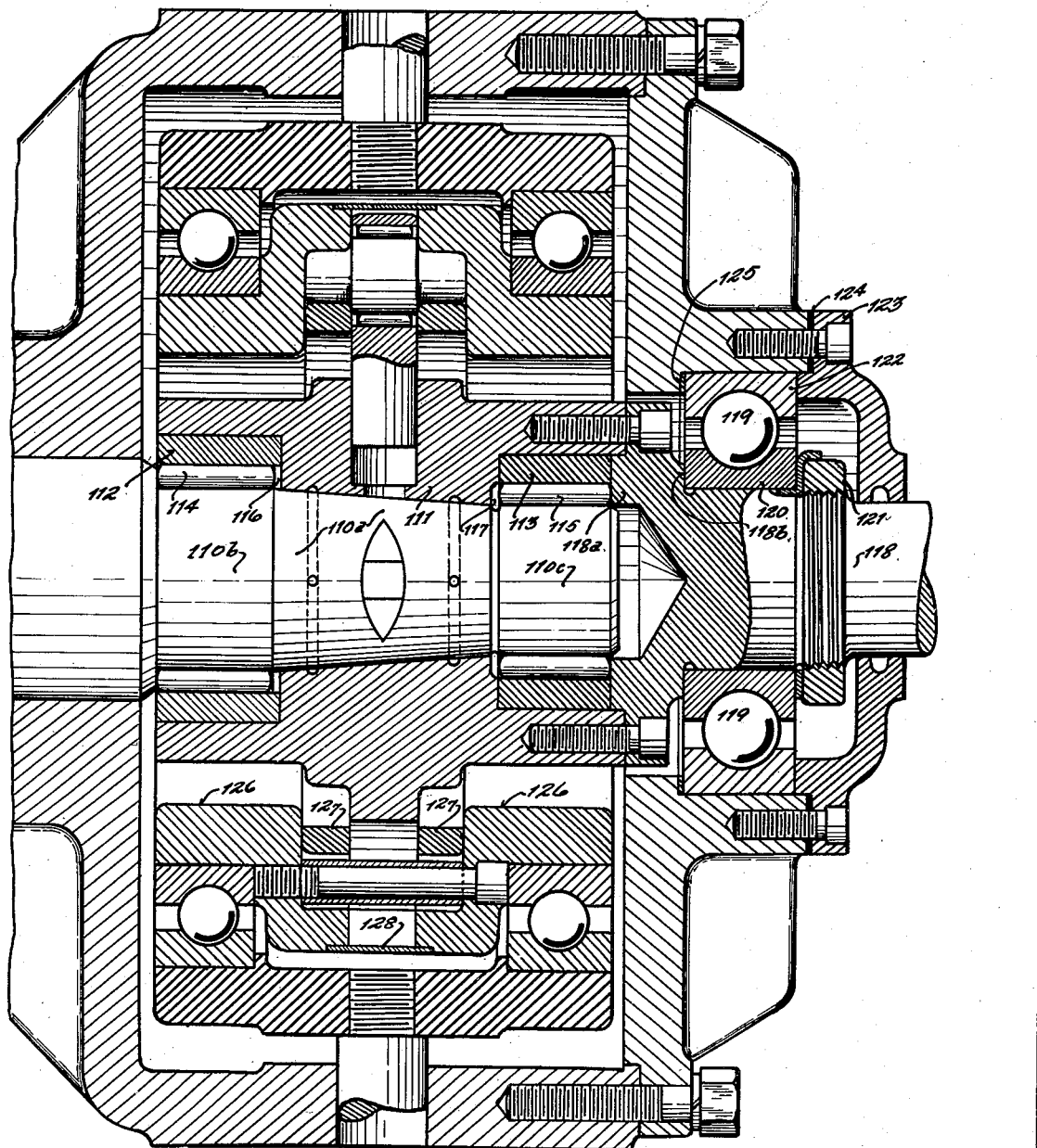
Figure 10:
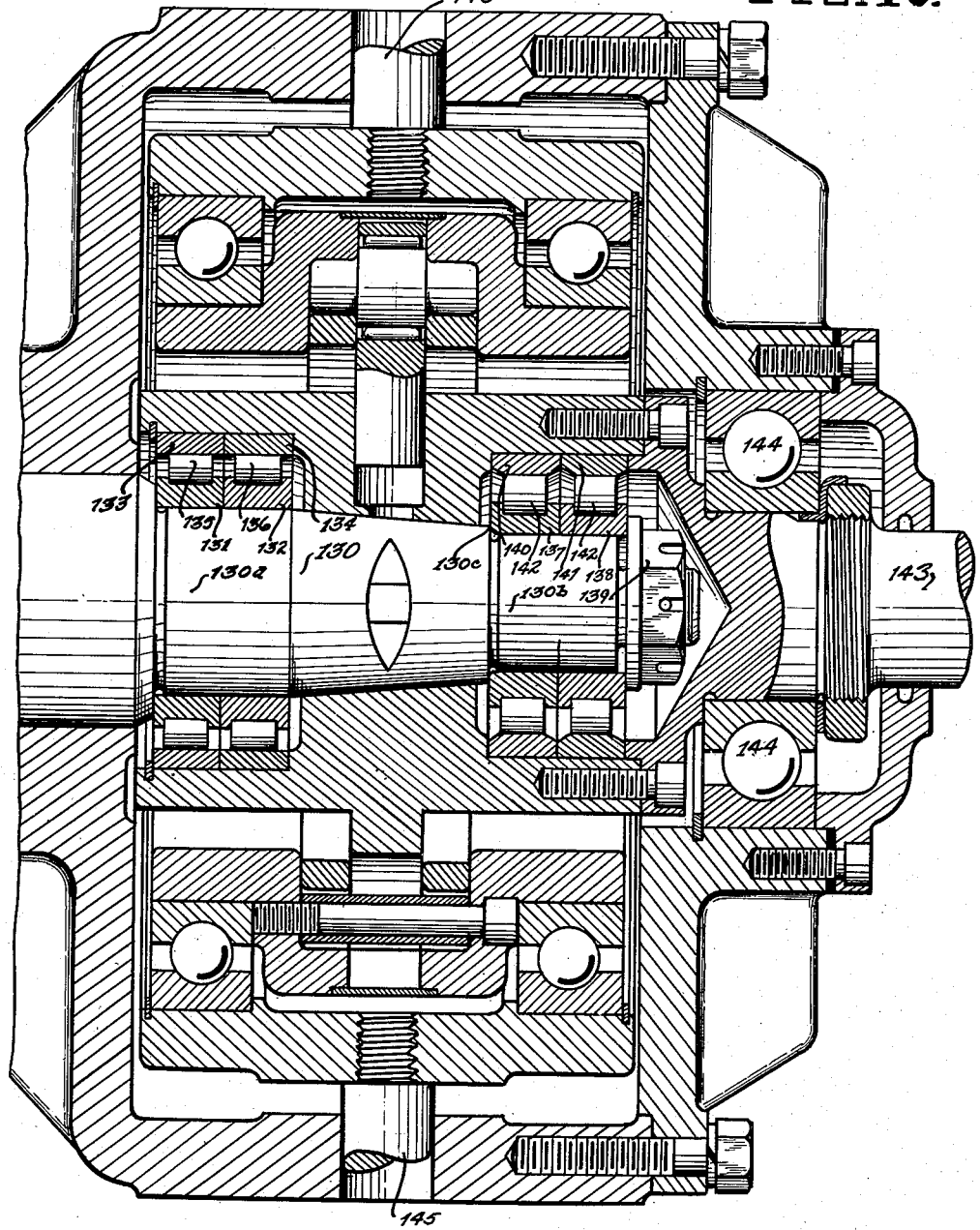

Figs. 6, 7 and 8 are sectional views taken on planes indicated by the lines 5—5, 7—7, and 8—8, respectively, of Fig. 5;

Fig. 9 is a sectional view of a modified pump or motor suitable for use in the transmission illustrated in Fig. 1 and is taken on a plane through its axis of rotation; and Fig. 10 is a sectional view similar to Fig. 9, illustrating a slightly modified form of the pump or motor employing commercial anti-friction bearings.

Figs. 11 and 12 are respectively diagrammatic illustrations of modified controls for a transmission such as illustrated in Figs. 1 to 3.

Fig. 13 is a portion of a typical horsepower characteristic curve, showing graphically the relation between speed and horsepower of a gasoline engine.

In order to better illustrate the advantages of the present invention, some features and problems of mechanical transmissions and internal combustion prime movers will be discussed. First, as to the prime movers of this character, the curve defining the horsepower output relative to the rotary speed defines a sharp parabola which increases rapidly to a given rated speed and thereupon drops rapidly, the crest of such a curve being illustrated in Fig. 13. The same is true of a Diesel type prime mover, though the parabola is less sharp. In both instances the maximum horsepower is delivered only at the very short peak portion of the curve, defining graphically the specific rated speed of the prime mover, and drops off rapidly in both directions from the peak. As exemplary of such operations, the curve will often slope so that it follows roughly a straight line extending at 45° to the abscissa from the point of zero speed, reaching its highest point at about 2400 R. P. M. Thereupon the slope is roughly 135° to the abscissa. Consequently, with a prime mover speed of 1200 R. P. M., the prime mover will deliver only one half its horsepower.

Another characteristic of such prime movers in terms of horsepower and torque is that the maximum torque and maximum horsepower do not occur at the same engine speed but at a considerable distance from each other. The curves defining these relations intersect at a point which is neither maximum torque nor maximum horsepower. Consequently, maximum torque is obtained only at a sacrifice in efficiency of the prime mover and maximum horsepower is obtained only at a sacrifice in torque. As exemplary of these characteristics, assuming the torque is maximum at a speed of $N_1$ R. P. M. and horsepower is maximum at $N_2$ R. P. M., $N_2$ is usually two or three times as great as $N_1$.

The effect of these characteristics as applied to the conditions met on the road, must be carefully considered. If the prime mover is slowed down to $N_1$ revolutions, specifically 1200 R. P. M., the prime mover will deliver only about one half its horsepower. Consequently, if the vehicle is operating up-grade and the prime mover is not powerful enough to drive the vehicle at full speed up such a grade, the prime mover speed begins decreasing with a consequent decrease in both horsepower and efficiency. The power thus drops when most required, namely at low speed and high torque. This augments the decrease in available driving power to such an extent that stalling results, or at best, it requires shifting of the gears. Shifting gears under such conditions is difficult and often hazardous and, even when accomplished, provides a transmission ratio so low that the prime mover usually must be operated above its specific speed to provide any appreciable speed of travel of the vehicle. If the prime mover speed is increased unduly to overcome this low rate of travel, its efficiency decreases rapidly, and no proportionate change in speed of travel is obtained. Even though the prime mover might be operated at maximum horsepower delivery, the translation of this horsepower into torque is not efficient, the torque being more than required for the desired speed of upgrade travel.

More specifically the prime mover may be driving the vehicle on a level roadway and suddenly be forced to operate upgrade. The speed of the prime mover immediately decreases to $N_1$, at which better torque is provided for the power actually delivered to the transmission but the delivered power is only half the maximum power which the prime mover is capable of developing. Thus with fixed speed change mechanical gear transmissions, torque and horsepower must, of necessity, be sacrificed, one to the other, in varying degrees.

In the present transmission, the horsepower delivery of the prime mover, regardless of the prime mover speed, is translated into torque efficiently and in an infinitely variable speed relation, the prime mover output being converted into low speed, high torque or high torque, low speed, throughout an infinite range of combinations of infinitely small increments.

Referring first to Figs. 1 to 3, inclusive, there is illustrated a transmission including a substantially cylindrical main casing 1, divided into separate compartments by a central spider or partition wall 1a, which is preferably integral with the casing 1. At the end of the transmission, driven by the engine, for example, the left end of the transmission in Fig. 1, the casing 1 is provided with a bell end cover 2, similar to the type provided for mechanical gear transmissions for motor vehicles, the bell casing 2 being rigidly affixed to the casing 1 by suitable bolts 2c, as illustrated. The outer end of the bell is provided with a radial flange 2a having bolt-holes 2d so positioned that the bell can be directly connected to the usual engine block in the same manner as the housing of mechanical gear transmissions. The bell cover 2 is provided with a rigid hub portion 2b which is closed, in turn, by a supplemental cover 3. At the opposite end, the casing 1 is closed by a rigid cover 4, having a central hub portion 4a on which is carried a supplemental end cover 5.

The partition wall 1a has a central hub portion 1b in which a rigid valve pintle 6 is fixedly mounted by an enlarged shank portion 6g, for example, by press fitting the pintle shank portion 6g in the hub portion 1b. The pintle 6 extends in both directions from the partition wall in coaxial relation to the casing, the extending portions of the pintle 6 being provided with valve portions 6a and 6b, respectively. At each end of the valve portion 6a are race portions 6c and 6d and at each end of the valve portion 6b are race portions 6e and 6f.

The valve portion 6a is tapered outwardly from the mounted shank portion of the pintle and has ports 7 and 8, respectively. The valve portion 6b has dual ports 9 and 10, respectively. For clarity in description, it is assumed that the ports 7 and 9 are the pressure ports, and the ports 8 and 10 the suction or low pressure ports. The port 7 communicates through suitable longitudinal ducts 11 in the pintle with the dual ports 9. The diametrically opposite port 8 communicates through ducts 12 with the dual ports 10. In the mounted shank portion of the pintle are diametrically opposite main radial ports 13 and 14. The port 13 communicates with the ducts 11 and with a bore 15 formed in the partition wall 1a and the port 14 communicates with the ducts 12 and with a bore 16 in the partition wall.

The bore 16, in turn, is in communication, through a duct 16a in the wall 1a, with the interior of the casing 1. Within the bore 15 there is provided a one way check valve 17 seated by a suitable coil spring 18. Beyond the valve 15 from the ducts 11 are a series of vents 19 which discharge into the interior of the casing. Thus a completely internal fluid circuit is provided, the casing forming a sump in which the oil level is maintained at a predetermined level above the inlet of the duct 16a for example, at the level indicated by the markers X in Fig. 2.

Assuming that the pump is operated on the valve portion 6a and the motor on the portion 6b with the ports 7 and 9 the operating pressure ports and the ports 8 and 10, the suction and low pressure ports, it is apparent that if the pump is maintained at constant stroke, the motor may be increased in speed by decreasing its stroke, this being accompanied by an increase in pressure in the duct 11. The stroke of the motor may be decreased completely to zero and therebeyond for effecting a reversal of the drive without varying the direction of operation of the pump. However, as the zero stroke position of the motor is approached, the pressure in the ducts 11 will become excessive. Likewise as the motor passes from zero stroke therebeyond for a reversal, an exceedingly high instantaneous pressure is created at the instant of reversal. The spring 18, however, is of such strength relative to the pressure on the exposed portion of the ball valve 17 that at these points of excessive pressure, the valve will be unseated, venting the pressure fluid through the bore 15 and bleeders 19 into the interior of the casing. Thus the pump may be operated continuously in the same direction and the motor being maintained at all times completely filled and under pressure.

The preferred pump structure comprises a rigid cylindrical barrel 20 having an axial valve bore 20a and a radial flange portion 21 with rigid hub portions 22 and 23, respectively, at opposite sides of the flange. The hub portions 22 and 23 are aligned radially with the pintle bearing portions 6c and 6d respectively and are counterbored for receiving anti-friction bearings. In the counterbore of the hub portion 23 is fixedly secured an outer bearing race 24 between which and the finish ground surface of pintle bearing portion 6d are elongated, full complement, cageless rollers 25. The rollers 25 support the corresponding end of the barrel in coaxial relation to the pintle while permitting axial floating movement of the barrel relative to the pintle, operating clearance being provided between the end of the hub 23 and the mounted portion of the pintle and wall 1a to permit axial movement of the barrel.

Fixedly secured to the opposite end of the barrel 20 through the medium of the hub 22 is a rigid impeller shaft 26 having at its inner end a radial flange portion 26a, through the medium of which it is bolted to the end of the hub 22. The impeller is also provided with an annular, axially extending hollow boss 26b which fits accurately within the counterbore of the hub 22 and is finish ground on its inner peripheral surface to provide the outer race of full complement cageless needle rollers 27 which operate between the boss 26b and the finish ground surface of the bearing portion 6c of the pintle. The hub 2b of the cover plate 2 accommodates combination radial load and two way thrust bearing 28, the outer race of which is secured against a suitable internal radial shoulder of the hub portion 2b and an end shoulder of the supplemental cover 3. The inner race of the bearing 28 is secured on the impeller 26 being held in axial position by a suitable lock nut 29.

The cover plate 3 is detachably secured by bolts 3a as illustrated, to the hub portion 2b so that by the interposition of suitable shims between the proper ends of the outer race of the bearing 28 and the associated shoulders, the barrel 20 may be adjusted axially and held in the adjusted position. Correspondingly, due to the lock nut 29, suitable shims 29a may be interposed between the ends of the inner race and the lock nut or the impeller so that the inner race may be properly positioned with respect to the outer race in the desired adjusted axial position of the barrel. Additional adjustment axially may be obtained, if desired, by the interposition, of shims between the radial flange 26a of the impeller and the end of the hub 22 of the barrel. Thus with these axial adjustments and with the barrel mounted on the pintle by elongated full complement cageless rollers for axial movement relative thereto, free operation and adjustment of the barrel and of the positive radial clearance between the tapered valve bore of the barrel and correspondingly tapered pintle valve portion 6a, may be effected. Furthermore, due to the use of sets of full complement bearings 25 and 27, an extremely high radial load bearing capacity and minimum radial dimension of the pump structure are obtained concurrently.

In the barrel 20, in the zone of the flange 21, are radial cylinders 30 each of which has a port 31 cooperable successively with the pintle valve ports 7 and 8. In the flange 21, in radial alignment respectively with the cylinders 30, are piston head guideways 32 and spaced circumferentially of the flange between the guideways are recesses 33 which open outwardly through the peripheral wall of the flange.

Mounted, one in each cylinder, are reciprocable pistons 34, each having an enlarged crosshead 35, preferably formed integral with the associated piston, the crossheads being reciprocable along and guided by the associated guideways 32. The guideways 32 and the cooperating walls of the heads 35 are preferably arcuate or undercut, as illustrated in Fig. 3, so that the guideways constrain the pistons from lateral rocking and from rotation about their axes and consequent skewing of the operating pins thereof, later to be described. In each crosshead 35 is a transverse bore extending parallel to the axis of rotation in which a rotatable cross-pin 36 is mounted on capillary cageless needle rollers. As illustrated, each crosspin has an enlarged central portion coextensive axially of the pin with the associated crosshead 35, and reduced end portions extending therefrom for cooperation with an adjustable rotary reactance means, later to be described.

The reactance means comprises a pair of matched coaxial rings 40, each of which has a hub portion terminating at its inner end in a radial wall portion, the radial wall portion having a circumferential groove 40a opening toward the barrel flange. The rings 40 are mounted in axially spaced relation so as to snugly accommodate the flange 21 of the barrel therebetween with operating clearance, and with the reduced end portions of the crosspins in rolling cooperation with the circumferential grooves 40a. For holding the reactance rings 40 fixedly in axial position with respect to each other and for reinforcing the same in the zone of the grooves 40a, suitable tie bolts 41 are provided. The bolts 41 extend parallel to the axis of rotation and are positioned radially of the rings in the grooves 40a so as to draw the rings toward each other.

The bolts are positioned circumferentially so as to lie within the recesses 33 of the flange. Sleeve compression spacers 42 are carried on the bolts 41 and extend into the grooves 40a, the ends of the spacers abutting the bottom walls of the grooves to constrain the rings to accurate axially spaced relation to each other. In order to retain slip fluid in the space between the rings 40 an annular oil retaining band 43 is clamped between the rings at their outer margins.

The inner portions of the radial walls of the rings 40 are shaped to conform accurately in cross section to the cross section of the barrel at the zone of the barrel along which they extend, so that the greatest strength and reduction in size commensurate with the range of stroke is effected.

The rings 40 are rotatably mounted through the medium of their hub portions in sets of combination load and thrust bearings 44, the outer races of the bearings 44, in turn, being press fitted into suitable rigid rings 45, each of which has a high section modulus to withstand distortion. The rings 45, in turn, are mounted in an adjustable stator 46. Each of the rings 45 is provided with an inner radial shoulder 45a which constrain the sets of bearings 44 from axial separation. The stator 46, in turn, is provided with radial shoulders 46a which constrain the rings 45 in spaced relation from each other so that a rigid structure is provided, the rings 45 being fixedly secured against the shoulders 46a by suitable radial bolts, as illustrated.

As better illustrated in Fig. 3, the stator is provided with diametrically opposite plane parallel bearing surfaces 46b which operate on parallel bearing surfaces which may be formed directly in the casing 1 so as to support and guide the stator in the zone of the working reactance for adjustment to different degrees of eccentricity. For effecting adjustments of the stator, a suitable rod 47 is connected thereto and extends parallel to the guide surfaces 46b, through an oversize bore in the casing 1, the rod 47 preferably being connected to or forming a part of the piston 48 of a double acting pilot controlled servo-motor, designated generally as 49, and later to be described.

The motor portion of the transmission comprises a barrel 50 mounted for axial adjustment along the pintle valve portion 6b on cageless full complement bearings 51 and 52 respectively, which cooperate with the races 6e and 6f of the pintle. The barrel is secured against axial displacement by two-way thrust bearing 53 corresponding in form and function to the bearing 28 and correspondingly secured to the impeller 50a which is to be connected to the torque shaft of the vehicle.

In order to provide a motor of proper capacity and which can operate efficiently down to one tenth maximum stroke, the motor is preferably of the dual piston type, including two sets of radial cylinders 54, cooperating with the ports 9 and 10. The cylinders 54 are preferably each the same size as the cylinder 30 of the pump. Twin pistons 55 are mounted in the cylinders 54 and carry a common rotatable thrust pin 56, a suitable spacer 57 being provided between the piston heads to maintain them in proper position and to retain the needle bearings in the bores thereof. Reactance rings 58, rotatably mounted in a stator 59 and corresponding to the rings 40 and stator 46 are provided. The stator 59 is operated, in turn, by a suitable operating rod 60 which extends through an oversize bore in the casing 1. Since both the rods 47 and 60 are accommodated in oversize bores, reasonable movement of the reactance ring axially of the transmission so as to permit adjustment of the barrels and pintle is provided. The rod 60 likewise may be formed integral with the main operating piston of a two-way pilot controlled follow-up servo motor.

Since the pump is preferably operated from zero to maximum stroke and is rotated only in one direction and is not to be reversed for reversing the drive, a suitable set screw 61 is provided diametrically opposite to the operating rod 47 for limiting the movement of the reactance toward zero stroke. This pin is preferably so adjusted that the stroke of the pump can be set to just a sufficient part of the stroke to supply slip fluid during idle operation of the prime mover, thus maintaining the hydraulic circuit completely filled and under pressure at all times. A corresponding adjustment screw 62 may be provided for the motor, but, when so provided for the motor, is preferably adjusted to limit the motor speed in reverse.

In the present structure, the stroke-diameter ratio of both the pump and motor are such that they will operate throughout a wide range efficiently. The fluid capacity of the motor is considerably more than that of the pump and consequently less change in the stroke of the motor is necessary than in the pump to effect a given change in the speed ratio of the transmission. It is desirable to properly correlate the pump and motor that the stroke of each is adjusted to some degree during certain stages of operation. For ease and accuracy in such adjustments, the reactance of the motor also is controlled by a suitable pilot controlled servo motor, designated generally at 63. The servo motors 49 and 63 correspond in form and function and only parts of the servo motor 63 will be referred to in detail.

The servo motor 63 comprises the main or follow-up plunger 64 and a cooperating pilot plunger 65, both of the plungers being vented through the rod 60 into the interior of the transmission casing 1. In order to prevent axial separation of the pilot plunger and the follow-up plunger, the follow-up plunger is provided with an internal annular recess 66 and the pilot plunger with an aligned annular recess. The pilot plunger also has an axial bore 67 with a transverse bore connecting the axial bore and the annular recess so that ball bearings 68 may be fed through the bore 67 and transverse bore and fill the recess 66 and the aligned recess of the pilot plunger. The recess 66 and aligned recess of the pilot plunger are preferably slightly greater in dimension axially of the pilot plunger than the diameter of the balls 68 so that a slight lost motion is provided therebetween. The pilot plunger is urged axially outwardly by means of a coil spring 69 interposed between it and a suitable counterbore in the operating rod 60. The pilot plunger of the pump is correspondingly urged outwardly by a similar spring.

Carried on the casing of the servo motor 63 is a suitable rigid arm 70 to which is pivotally connected a lever 71 having a portion 71a cooperating with the pilot plunger of the pump for urging it inwardly and a shorter portion 71b at the opposite side of the pivotal support for cooperation with the pilot plunger 65 of the motor. Adjustable screws 72 and 73 are provided in the respective ends of the arms 71a and 71b and may be moved to the desired position and locked in place by lock nuts as illustrated. The screws 72 and 73 form the operating abutments respectively for the pilot plungers of the pump and motor.

Referring to Fig. 4, the operation of this structure is illustrated. The levers 71a and 71b are urged to and yieldably held in a normal position wherein the pump stroke is minimum and the motor stroke maximum by a spring 74. The lever 71b is swung clockwise to reduce the motor stroke and upon continuing in a clockwise direction, it moves the motor reactance ring to overdrive position and finally beyond neutral position, the latter position reversing the direction of rotation of the motor. At an intermediate position, the motor is at zero stroke, wherein the valve 17 is opened and by-passes any excess pump discharge into the casing 1. Correspondingly, when the lever 71a is moved counterclockwise the stroke of the pump is decreased and when the lever is moved clockwise, the stroke is increased.

However, the lever portion 71a is proportioned relative to the lever 71b that the resultant force couple on the lever 71 from the single row of pistons 34 of the pump thereon is balanced by the twin pistons 55 of the motor acting on the lever portion 71b. Thus with the pistons 55 each equal to the piston 34, the lever portion 71a would be twice as long as the lever portion 71b. Here it should be noted that the servo motors 49 and 63 may be dispensed with and the levers 71a and 71b connected directly to the rods 47 and 60, if desired, as manual operation of the lever 71 does not have to overcome the force of the reactances but only the differential between the reactances which may be substantially zero.

The lever 71 is urged in a counterclockwise direction by means of a spring 74 and is connected through the medium of a rod 75, rocker 76, and a rod 77 to the foot accelerator 78 of the vehicle. The rod 77 is guided between suitable rollers 79 so as to be freely movable and the upper end of rod 77 abuts but is not fastened to the accelerator pedal 78. In operation, when the prime mover is idling, the accelerator 78 is in fully raised position and the lever 71 is rocked in a counterclockwise direction by the spring 74, until the portion 71b is against the stop 80. In this condition, the pump is at substantially zero stroke, or sufficiently close thereto so that only replacement slip fluid is supplied. The motor, in this condition, is at full stroke for the forward direction. Thus the pressure circuit is completely filled and no motion is transmitted by the transmission.

As the foot accelerator is depressed, however, the speed of the prime mover increases. Concurrently, the lever 71 is rocked in a clockwise direction, decreasing the stroke of the motor and lifting the portion 71a free from the servo motor pilot plunger of the pump, which is then urged outwardly toward maximum stroke position by its spring, which, as described, corresponds to the spring 69 of the servo motor 63. This movement of the lever portion 71a is preferably such that at normal driving speed, the pump may be at half stroke and the motor at half stroke. This relation may occur when the prime mover is operating below its rated speed. Overdrive is preferably obtained with the pump operating at from one-half to full stroke and the motor operating from one-half to one-tenth stroke. These ranges are determined according to the conditions under which the vehicle is to be operated and the screws 72 and 73 adjusted accordingly. Obviously, a very great acceleration is thus provided due to the rapidly increasing volume of fluid discharged by the pump. Additional acceleration is effected by virtue of the fact that the motor stroke is being concurrently reduced. The relation between the two is preferably such that with the prime mover operating at its rated speed the pump remains at maximum stroke and the motor stroke is further reduced. Due to the dual piston arrangement and stroke-diameter ratio of the motor and its capacity relation to the pump, it operates with a very high degree of efficiency at half stroke, this high efficiency being continued to a very small fraction of full stroke because of the antifriction coaction of the crosspins 56 and reactance means.

If an extremely high speed is required after the pump has reached maximum stroke, the motor stroke can be additionally reduced until the drop in efficiency of transmission tends to offset the advantages obtained. Thus at slow speeds with light load on the vehicle, or on level roadways, the prime mover may operate slowly and below its rated speed with the pump at maximum stroke and the motor at comparatively short stroke so that an overspeed is obtained relative to the prime mover and a saving effected even though the prime mover is not operating at full efficiency.

For reversal, a hand lever 81 is connected to the lever 71. To effect a reversal, the lever 81 is moved clockwise as far as it will go, thus moving the lever 71 to its extreme position in which it is no longer operated by the accelerator 78 through the linkage 77, 76, 75. When the lever 71 is in its extreme reverse position, the eccentricity of the motor is the reverse of the eccentricity of the motor during normal forward operation while the eccentricity of the pump is not changed. The transmission will therefore operate in reverse, and the starting and stopping and the control of the speed may be accomplished by controlling the prime mover. If the vehicle is traveling at high speed, efficient cushioned braking action free from extreme shocks is provided. For example, when the operator lifts his foot from the accelerator, the pump stroke is greatly reduced or set to almost zero automatically, and the motor stroke increases rapidly toward full stroke. The motor thereupon becomes a pump driven by the inertia of the vehicle. This develops fluid volume in excess of the instantaneous capacity of the pump whereupon the fluid pressure increases greatly, and is relieved by the valve 17. The duct 13 and bleeder vents 19 of the valve are relatively small and the fluid pressure is relieved gradually by forcing the fluid therethrough, thus effectively reducing the speed of travel.

Referring next to Figs. 5 to 8 inclusive, the pump or motor portion of a transmission similar to the transmission above described, but with a modified barrel mounting is illustrated. The pump or motor unit is mounted in a casing 90 which has a hub portion 91 at one end and which is closed at the opposite end by a bell cover 92. Mounted by one end in the casing is a pintle 93 having adjacent its mounted portion a slightly enlarged bearing portion 93a and having at the opposite end a bearing portion 93b. The pintle may be tapered as heretofore described.

The barrel 94 is provided with an axial bore complementary to the pintle. If desired, however, both the pintle and the axial bore may be of tapered diameter. In this structure the barrel 94 is mounted on the pintle through the medium of sets of full complement anti-friction roller bearings 95 and 96. One set of rollers is in cooperation with the barrel and the bearing portion 93a of the pintle, the other set being in cooperation with the barrel and bearing portion 93b of the pintle. The rollers 95 and 96 respectively are free and cageless and ground by centerless grinding methods so that absolute accuracy and precision in fit is provided.

Referring first to the set of bearings 95, the inner race 97 thereof is press fitted or otherwise fixedly secured on the bearing portion 93a of the pintle. The outer race 98 is fixedly secured in a counterbore in the corresponding end of the barrel. The outer race 98 is preferably provided with a circumferential recess forming the trough in which the rollers 95 may operate. The races 97 and 98 are so related that axial movement of the barrel is permitted, slight clearance being provided between the adjacent end of the casing hub portion 91 and the race 98 and barrel 94.

Referring next to the set of bearings 96 the inner race 99 thereof is preferably slip fitted onto the bearing portion 93b of the pintle and locked against a suitable shoulder thereon by means of a lock nut 100. The outer race 101 is secured in a counterbore in the corresponding end of the barrel and cooperates with the bearings 96 and inner race 99 so as to permit relative axial movement of the pintle and barrel. Connected to the end of the barrel remote from the mounted portion of the pintle is an impeller 102 having a radial flange 102a which firmly abuts the end of the barrel and having a boss 102b which fits within the barrel counterbore for engagement with the end of the race 101 of the bearings 96, thus holding the race in position. The impeller 102 is secured in place by suitable bolts as illustrated. By the interposition of shims 103 between the ends of the portion 102b and outer race 101, the position of the race 101 may be adjusted slightly and always secured fixedly and firmly in the adjusted position.

In order to prevent deflection of the free end of the pintle, to indirectly support the same in the casing, and also to resist both radial load and two way directional axial thrusts on the barrel for securing the barrel in position in the casing, a set of large anti-friction ball bearings 104 is provided, these bearings operating in deep grooves in inner and outer races 105 and 106. The inner race 105 is mounted externally on the barrel adjacent the impeller end and secured in place by a suitable lock nut 107, shims, as illustrated, being interposed between the nut 107 and race 105 so as to securely hold the latter in position. The outer race 106 is mounted in an internal recess in the cover 92. The set of large bearings 104 prevents deflection of the free end of the pintle and secured the barrel in proper axial position, while at the same time, the opposite end of the barrel may float axially under expansion and contraction. Sufficient axial clearance between the housing end of the barrel and end of the hub portion 91 is provided for permitting this action unrestrained and for permitting the axial adjustment of the barrel. The barrel has suitable radial cylinders and adjustable rotary reactance means as illustrated.

With this structure, the support of the barrel in the casing may be adjusted, as also may the axial position of the barrel on the pintle, and by a proper correlation of these adjustments, the desired high efficiencies can be obtained. Another advantage of this structure is the ease of disassembling the same. For this purpose it is only necessary to remove, in order, the end cover plate 92, the impeller 102, and the lock nut 100, and then, the barrel may be slid from the pintle. In such instance, of course, the operating rods of the reactance means are first detached.

Referring next to Fig. 9, there is illustrated a pump or motor, which may be used in duplicate in a single transmission circuit in which the pump and motor may be identical. In this structure, there is provided a pintle having a central tapered valve portion 110a as illustrated, and bearing portions 110b and 110c, the portion 110b being larger in diameter than the portion 110c. The bearing portions 110b and 110c are arranged at opposite ends of the valve portion 110a and are finish ground on their surfaces to provide inner bearing races, thus conserving radial dimension. The barrel 111 has an axial bore tapered to correspond to the tapered valve portion 110a of the pintle and is counterbored at the ends to accommodate the outer races 112 and 113, respectively.

For supporting the barrel on the pintle, full complement sets of anti-friction rollers 114 and 115 are interposed, respectively, between the races 112 and 113 and the associated pintle bearing portions, the rollers preferably being cylindrical. End clearance is provided between the base of the counterbores of the barrel and the respective sets of bearings 114 and 115, as indicated at 116 and 117, respectively, so that the barrel is axially floating with respect to the pintle while the pintle and barrel are constrained to precise coaxial relation with positive uniform radial clearance. Consequently the barrel may be shifted on the pintle for adjusting the clearance and expansive forces are relieved.

In order to provide for shifting of the barrel and also to retain the races 113 in position, an impeller 118 is provided, the impeller being bolted to the end of the barrel and having a boss portion 118a overlying the outer end of the race 113 and the bearings 115, thus constraining them from movement outwardly from the barrel. The barrel is also supported in the casing through the medium of the impeller, this support being effected by means of combination radial load and two directional thrust bearings 119, the inner race 120 of which is secured in fixed position axially on, and against the shoulder of, the impeller 118 by means of a suitable lock nut 121. The outer race 122 is mounted in the end cover of the casing and is held in place axially by a supplemental cover 123 which is bolted to the end cover of the casing.

For adjusting the position of the race 122 to effect a desired adjustment of the barrel axially in the casing or with respect to the pintle, suitable shims 124 are interposed between the supplemental cover 123 and the end cover of the casing. Additional shims 125 are inserted between the inner end of the race 122 and a suitable shoulder in the end cover of the casing, as illustrated. By the proper choice of shims, a desired location of the race 122 axially of the barrel may be provided. In event it is desired to reposition the inner race 120, due to adjustments of the outer race, suitable shims may be interposed between it and the shoulder 118b of the impeller.

With this arrangement, adjustment may be readily made in the following manner. The barrel may be moved opposite to the direction of taper of the pintle until all of the radial clearance between the pintle and barrel bore is eliminated. The barrel is then drawn back in the opposite direction a predetermined amount and located axially in this position by means of the impeller bearings 119, the bearings 119, in turn, being secured in proper position and accurately positioned by the shims 124 and 125. Axial clearance is provided between the outer end of the race 112 and adjacent casing wall so as to permit the limited axial adjustment of the barrel.

This structure also utilizes separate outer reactance rings 126 and inner reactance rings 127, each ring 126 and an associated ring 127 defining the circumferential groove for the piston crosspins. Since the rings 126 and 127 are separately formed, the surfaces thereof may be finish ground so that all operating surfaces thereof can be formed with the usual industrial equipment with a high degree of precision. The outer periphery of the rings 126 is sealed by a suitable oil retaining ring 128 so that the thrust pins cooperating with the pistons and the reactance rings operate in oil baths.

In Fig. 10 there is illustrated a structure similar to that illustrated in Fig. 9 with the exception of the mounting of the barrel on the pintle. The structure of Fig. 10 illustrates a manner of providing the desired mounting through the medium of commercial roller bearings. Since these bearings are readily available on the market it is desirable that such be used instead of special bearings which are expensive unless manufactured in quantities. The rollers must have sufficient roller capacity and since the commercial bearings are extremely short, it is necessary to include two sets of rollers at each end of the pintle for eliminating chatter between the pintle and barrel.

This structure utilizes a pintle 130 having bearing surfaces 130a and 130b. Mounted on the bearing surface 130a are two inner races 131 and 132 arranged in end to end relation. Outer radially aligned races 133 and 134 cooperate therewith and accommodate therebetween cylindrical roller bearings 135 and 136. The inner races 131 and 132 may be press fitted onto the bearing portion 130a so as to remain permanently on the pintle. The outer races, which are fixedly secured to the barrel, are axially floating with respect to the inner races so as to be removable with the barrel. At the opposite end of the pintle are inner bearing races 137 and 138 arranged end to end, the race 137 abutting a suitable shoulder 130c on the pintle, these races being adjustably secured in position by a lock nut 139. Corresponding outer races 140 and 141 are mounted in a counterbore of the barrel and held firmly in place by the impeller, as later will be described. Interposed between the corresponding races are cylindrical heavy duty roller bearings 142. The inner races 137 and 138 are preferably slip fitted onto the pintle whereas the outer races 140 and 141 are held fixedly in position therein by a suitable abutment on the impeller 143 which is rigidly bolted to the end of the barrel.

For supporting the impeller in the casing, and, through the medium thereof, the barrel, heavy duty two directional thrust ball bearings 144, capable of withstanding both radial load and two way thrust, are provided, though tapered roller bearings or two sets of oppositely tapered roller bearings may be used instead. The bearings 144 are secured in operating position in the same manner as the bearings 119 of Fig. 9 heretofore described. The barrel is securely held in place by the bearings 144 in any adjusted position of the latter, both with respect to the casing and the pintle, while at the same time, adjustment of the barrel with respect to the pintle and free axial floating of the barrel on the pintle is provided. Control rods 145, which are provided for adjusting the reactance means to vary the stroke, extend through a bore in the casing, the bores being oversize, though not shown as such, to permit axial floating movement of the reactance means during adjustment of the barrel on the pintle.

Referring next to Fig. 11 a modified control is illustrated wherein separate levers 150 and 151 are provided for controlling the pump and motor respectively. In this structure the lever 150 is urged by a spring 152 in a direction to set the pump at maximum stroke at which it is generally operated, the lever 150 being connected to the servo-motor 49' of the pump. The lever 151 is urged by a spring 153 in a direction to reduce the motor stroke. Suitable friction latches are provided on the levers 150 and 151 to retain the pump and motor strokes at any desired setting, respectively. Thus by manipulating the levers 150 and 151 any predetermined ratio of pump stroke and motor stroke may be obtained.

In many instances it is desirable to provide an overdrive speed relation, but it must be possible at the same time to obtain maximum power in case of an emergency such as steep grades and the like.

Referring to Figs. 12 and 13, there is shown in the latter the crest portion of a typical horsepower characteristic curve C of a gasoline engine plotted on the rectangular coordinates in which the horsepower is represented by the ordinate and the speed in revolutions per minute is represented by the abscissa. The normal driving speed $N_1$ of such an engine is usually at a point A below the maximum rated speed. The rated speed $N_r$, and consequently maximum horsepower, occurs at point B. It is desirable in overdrive that the overdrive occur at or near point B of the curve as otherwise the decrease in power will more than offset the additional speed due to overdrive. After the point B is passed, the curve drops so that at any point A' beyond the maximum rated speed, the speed $N_2$ is greater but the horsepower is reduced. To prevent the operator from passing the maximum rated horsepower when in an overdrive speed relation, the control illustrated in Fig. 12 may be used. A main foot accelerator 154 is provided and operates in the customary manner to control the speed of the engine. In addition to the accelerator 154, a supplemental foot accelerator 155 is provided, both accelerators being pivoted for rocking movement about and relative to a common shaft 156. A rod 157, corresponding in function to the rod 77 heretofore described and which operates the lever mechanism to control the strokes of the pump and motor is provided. At the upper end of the rod 157 is a transverse abutment portion 158, one end 158a of which underlies the accelerator 154 and the other end 158b of which underlies accelerator 155. The accelerator 155 is urged to its idle position by a spring 159 and does not control the engine except insofar as it operates the accelerator 154. Both accelerators operate the rod 157, however.

It is desirable that the engine speed be increased as the stroke of the motor is decreased until the engine is running at maximum rated speed at which the pump is at full stroke and the motor at substantially half stroke. To increase the speed of the engine concurrently with the increase in pump stroke and decrease in motor stroke, the bracket 160 is connected to the accelerator 155 and, in turn, is connected by a tension spring 161 to the accelerator 154 so that as the accelerator 155 is moved downwardly, the accelerator 154 is moved therewith. This concurrent movement of the two accelerators occurs and is continuous until the accelerator 154 has accelerated the engine to the maximum horsepower B. Beneath the accelerator 154 is a heavy compression spring 162 which, when the accelerator 154 has moved to maximum horsepower position, engages the same and arrests further movement thereof by the spring 161 yielding and due to the fact that the spring 162 is sufficiently strong to withstand compression by force applied through the spring 161 and accelerator 154. Consequently, upon continued downward movement of the accelerator 155, any overspeed drive may be obtained while the engine remains at maximum power. The accelerator 154 may be thereafter operated by the foot of the operator so that the control of the engine and transmission is independent of the accelerator 155. If desired, the portion 158a of the element 158 may be omitted in which case any setting of the transmission speed ratio may be obtained by the accelerator 155 in combination with any engine speed.

Most generally, the pump should be set at maximum stroke at all times and only shifted, and then to zero stroke, when it is desired to stop vehicle or transmission, all control of speed being effected through the motor. However, various driving conditions affect these settings. At maximum stroke of the pump, the engine may be operated at minimum rated speed which is usually one half the maximum rated speed. For city driving where it is necessary to start and stop frequently, it is best to relieve the operator from the dual lever operation and provide for large torque, and for long distance operation it is good practice to reduce the engine speed and control the vehicle speed by the motor only.

If desired, any of the usual release mechanisms operated by the engine speed may be employed so that at maximum rated engine speed, the release will move the pump to maximum stroke independently of the motor, leaving the operator free to control the operation entirely by the motor.

In order to summarize the advantages of the present structure and the manner in which variations in the operating characteristics of the transmission may be made for adapting the transmission to the specific operating conditions under which it is to be used, certain guiding principles should be considered.

For long distance travel in which heavy torques are only occasional, the pump and motor are preferably of the same capacity and operate at the same stroke. For city bus operation, however, or for short distance operation where the number of starts and stops are numerous, the motor may be several times as large as the pump in order to operate at high torque efficiently for slow starting and stopping, as such conditions of city driving constitute a great portion of the total driving of the vehicle, and the efficiency at low speeds, high torque is necessary even at a sacrifice of efficiency at higher average traveling speed. Thus different conditions of operation qualify the stroke diameter ratio of the particular pump and motor.

As heretofore generally discussed, present prime movers used in automotive vehicles produce maximum torque at about 1000 R. P. M., and maximum horsepower at 2100 R. P. M. so that maximum horsepower and maximum torque cannot be obtained simultaneously. The present system provides for control of the torque and the horsepower independently of the engine speed and of each other as follows:

(a) Power is controlled by pump displacement and pressure independently of the motor.

(b) Torque and speed may be controlled by the motor independently of the pump for any given pump delivery or in given relations to the pump.

(c) By these combined effects, the main object of the invention which is to maintain a given torque for the desired use and a given power delivery simultaneously is accomplished.

These effects cannot be obtained with direct drive because, at direct drive, for each speed of the engine, the torque and power are fixed, whereas the present transmission segregates the torque and power for independent control. Thus, with the present transmission, there is obtained:

(a) Power control of the engine, (b) Torque control of the vehicle, and (c) Overdrive for overall driving efficiency. The overdrive provides economy in that the engine operates in its economical fuel consumption range and, when the vehicle is not heavily loaded, this more economically provided power may be translated into greater speed.

In order to provide a pump or motor structure for higher speeds, such, for example, as 3600 R. P. M., the rotating radius of all parts should be reduced as much as possible. For instance, the pintle diameter may be reduced by using double row, smaller diameter pistons, preferably in both pump and motor sections. The smaller pistons, greater in number, permit a smaller pintle while maintaining an efficient stroke diameter ratio than do larger pistons of efficient stroke-diameter ratio. The smaller diameter pistons allow a smaller stroke, which is necessary for high speed in order to reduce the reciprocating speed of the pistons in the barrel to a value proportionate to pumps and motors which are driven by electrical motors wherein the speeds are about one third of the automotive engine speeds. Smaller pistons with shorter strokes permit reduction in the dimensions of secondary rotor and its bearings, particularly for the automotive super-speed engines.

In order to strengthen the pintle to offset the loss in strength due to its reduction in diameter, the inner races of the roller bearings 27, 25, 51 and 52 may be eliminated.

In order to reduce dimensions of servo-motors, both servo-motors may be actuated by the working pressure of the transmission. It will be seen that this can be done advantageously in the case of the motor, because at all times when the motor stroke is to be controlled, the pump will be set at a positive stroke and will be delivering control fluid for the motor, and the pressure circuit does not reverse.

However, at stop, or reverse drive, though the motor may be set at its full maximum stroke, the pump is set at neutral. When the pump is set at neutral, no control fluid is available therefrom to shift the pump stroke. For this particular instance however, auxiliary pressure means or mechanical means may be provided to provide a slight adjustment of the pump. As soon as the pump starts to pump, even the slightest amount, sufficient working fluid is provided for both hydraulic servo-motors and they may be operated by the working fluid as control power. This makes possible easy and effective control, because at greater pump and motor pressures, greater control pressure is provided automatically. By this method, self control powered servo motors are provided by which operation is assured under all conditions.

In case of self control powered servo motors, as described, the control piston of the servo motor should not be greater than one working piston, that is, if a differential control area is needed, such differential area will be equal to the area of one working piston.

In the preferred system, the pump control dispenses with the need of the clutch pedal of the conventional drive, whereas the motor will take over the entire drive as soon as the pump is set at a given power. However, as shown in Fig. 11, with separate control, the pump control may be operated easily mechanically also, because in this case it is not a continuous operation, but only intermittent starting or stopping. When unusually sensitive control is required, such as in Fig. 11, both pump and motor are equipped with servo motors, but in such a manner that with self energized servo motors, a slight pump stroke may be set mechanically in order to create pumping. The motor, however, can at all times be equipped with self energized control. With these guiding principles, adaptations of the transmission to various operating conditions may be made readily.

Though the illustrative embodiments of the invention have been described herein specifically as motor vehicle transmissions so as to more clearly disclose the operating characteristics thereof under varying conditions of use, it is not meant to limit the invention to the specific applications disclosed but to include all applications thereof.

Having thus described my invention, I claim:

1. In a hydraulic transmission, a variable delivery pump, a variable stroke, reversible motor, a movable common actuating means for increasing the pump instantaneous capacity and concurrently decreasing the instantaneous motor capacity during movement of said common actuating means along its path of movement in one direction until the pump has reached a predetermined stroke condition, and for thereafter additionally decreasing the stroke of the motor by additional movement of said actuating means in the same direction.

2. In a hydraulic transmission, a variable delivery pump, a variable stroke, reversible motor, a movable common actuating means for increasing the instantaneous pump capacity and concurrently decreasing the instantaneous motor capacity during movement of said common actuating means in one direction until the pump has reached a predetermined stroke condition and for thereafter additionally decreasing the stroke of the motor by additional movement of said actuating means in the same direction, and operative to decrease the motor stroke to zero and stop the motor upon additional movement of the actuating means in the same direction.

3. In a hydraulic transmission and prime mover combination, a variable stroke pump, a variable delivery, reversible motor, a common actuating meas for increasing the instantaneous pump capacity and concurrently decreasing the instantaneous motor capacity during movement of said common actuating means in one direction until the pump has reached a predetermined stroke condition, and thereafter additionally decreasing the instantaneous capacity of the motor by continued movement of said actuating means in the same direction, control means for controlling the speed of the prime mover, and means operatively connecting the control means and common actuating means for operating the common actuating means by said control means when the control means is operated in the speed increasing direction only until the pump has reached a predetermined stroke condition.

ELEK K. BENEDEK.